(12) United States Patent
Sekiyama et al.

(10) Patent No.: US 11,348,154 B2
(45) Date of Patent: May 31, 2022

(54) INFORMATION PROCESSING METHOD, GARMENT ORDER RECEPTION MANAGEMENT APPARATUS, AND NON-TRANSITORY COMPUTER-READABLE STORAGE MEDIUM

(71) Applicant: SPIBER INC., Tsuruoka (JP)

(72) Inventors: Kazuhide Sekiyama, Tsuruoka (JP); Goshi Uhira, Tsuruoka (JP)

(73) Assignee: SPIBER INC., Tsuruoka (JP)

( * ) Notice: Subject to any disclaimer, the term of this patent is extended or adjusted under 35 U.S.C. 154(b) by 303 days.

(21) Appl. No.: 16/513,767

(22) Filed: Jul. 17, 2019

(65) Prior Publication Data

US 2019/0340666 A1     Nov. 7, 2019

Related U.S. Application Data

(63) Continuation of application No. PCT/JP2018/001510, filed on Jan. 19, 2018.

(30) Foreign Application Priority Data

Jan. 20, 2017   (JP) .............................. JP2017-008217

(51) Int. Cl.
G06Q 30/00      (2012.01)
G06Q 30/06      (2012.01)
G06Q 30/02      (2012.01)

(52) U.S. Cl.
CPC ..... *G06Q 30/0621* (2013.01); *G06Q 30/0283* (2013.01); *G06Q 30/0643* (2013.01)

(58) Field of Classification Search
CPC ........... G06Q 30/0621; G06Q 30/0283; G06Q 30/0643

(Continued)

(56) References Cited

U.S. PATENT DOCUMENTS 5,844,554 A  * 12/1998 Geller ....................... G06F 8/38
                                                          715/744
7,003,548 B1 *  2/2006 Barck ..................... G06F 30/00
                                                          709/203

(Continued)

FOREIGN PATENT DOCUMENTS

CN       101567074 A       10/2009
CN       105989618 A       10/2016

(Continued)

OTHER PUBLICATIONS

"Consumer preferences for blended organic cotton apparel," Hustvedt, Gwendolyn. ProQuest Dissertations and ThesesProQuest Dissertations Publishing. (2006); Dialog #305316043, 286pgs. (Year: 2006).*

(Continued)

*Primary Examiner* — Robert M Pond
(74) *Attorney, Agent, or Firm* — Basil M. Angelo; Angelo IP (57) ABSTRACT

An information processing method performed by a processor, the method comprises garment selecting of receiving a selection of a garment from a user, price calculating of calculating a price of the garment on the basis of a type of the selected garment and parameters relating to a design and materials set for the garment, display controlling of causing a display part to display the calculated price, and parameter changing of changing the parameters in conjunction with an input from the user. The display controlling includes causing the display part to display the price that reflects the changed parameters in response to the change of the parameters.

12 Claims, 9 Drawing Sheets

(58) Field of Classification Search
USPC .................................................... 705/26, 27
See application file for complete search history.

(56) References Cited

U.S. PATENT DOCUMENTS

| | | | | |
|---|---|---|---|---|
| 8,355,957 | B2* | 1/2013 | Herbert | G06Q 30/0643 |
| | | | | 705/26.5 |
| 10,366,175 | B2* | 7/2019 | Gupta | G06Q 30/0621 |
| 11,244,223 | B2* | 2/2022 | Sareen | G06Q 10/101 |
| 2006/0287877 | A1 | 12/2006 | Wannier et al. | |
| 2009/0019624 | A1* | 1/2009 | Birk | A41D 31/08 |
| | | | | 2/455 |
| 2011/0137758 | A1* | 6/2011 | Bienias | G06Q 30/0643 |
| | | | | 705/27.2 |
| 2012/0331422 | A1* | 12/2012 | High | G06Q 50/00 |
| | | | | 715/849 |
| 2013/0132273 | A1* | 5/2013 | Stiege | G06Q 20/14 |
| | | | | 705/41 |
| 2013/0211881 | A1* | 8/2013 | Mohapatra | G06Q 30/00 |
| | | | | 705/7.35 |
| 2014/0277683 | A1* | 9/2014 | Gupta | A41H 3/007 |
| | | | | 700/132 |

FOREIGN PATENT DOCUMENTS

| | | |
|---|---|---|
| JP | 1998340298 | 12/1998 |
| JP | 2000187683 A | 7/2000 |
| JP | 2001331694 A | 11/2001 |
| JP | 2002169993 A | 6/2002 |
| JP | 2004265239 A | 9/2004 |
| JP | 2004341834 A | 12/2004 |
| JP | 2006252402 A | 9/2006 |
| JP | 2008287684 A | 11/2008 |

OTHER PUBLICATIONS

International Preliminary Report on Patentability by Japanese Patent Office for PCT International Application PCT/JP2018/001510 dated Aug. 1, 2019.
Author unknown, blog entitled "Basic Tips and Tricks for Making Characters in the Black Desert [Modeling]", published on Oct. 4, 2015, obtained from url https://chimolog.co/blackdesert-charactermaking-kotsu-makeup/ on Aug. 24, 2019.
Notice of Reasons for Refusal in Japanese Patent Application No. 2017-008217, Japanese Patent Office, dated Aug. 8, 2019.
Author unknown, Mom feels relieved even in cold winter wool wrapped in cotton and its fluffy texture and warmth can make baby feel happy—Familiar's 'Gentleness' has 'technique'—100% natural material 'pure baby wool' arrives, published by PR Times Inc., pp. 1-2, retrieved from https://prtimes.jp/main/html/rd/p/000000013.000013326.html on Sep. 1, 2015.
Author unknown, Price List dated Aug. 9, 2016, published by Su Misura, pp. 1-2, retrieved from https://web.archive.org/web/20160809123431/http://su-misura.jp/price/> on Mar. 15, 2018.
International search report of the International Search Authority (JPO) of PCT/JP2018/001510 dated Apr. 3, 2018.
Rikuko Kaya, Notice of Reasons for Refusal for Japanese Patent Application 2017-008217, Japanese Patent Office, dated Jan. 31, 2019.
Extended European search report for European patent application 18741201.0, national phase entry of PCT/JP2018/001510, dated May 28, 2020.

* cited by examiner

| Type of Material | Unit Price |
|---|---|
| Material A | aaa [$/g] |
| Material B | bbb [$/g] |
| ⋮ | ⋮ |
| Material X | xxx [$/g] |

INFORMATION PROCESSING METHOD, GARMENT ORDER RECEPTION MANAGEMENT APPARATUS, AND NON-TRANSITORY COMPUTER-READABLE STORAGE MEDIUM

CROSS-REFERENCE TO RELATED APPLICATIONS

The present application is a continuation application of International Application No. PCT/JP2018/1510, filed on Jan. 19, 2018, which claims priority to Japanese Patent Application No. 2017-008217, filed on Jan. 20, 2017. The contents of these applications are incorporated herein by reference in their entirety.

BACKGROUND

This invention relates to an information processing method, a garment order reception management apparatus, and a non-transitory computer-readable storage medium, in particular, to a technique of ordering a garment online.

Conventionally, a technique that receives body measurements for a consumer and compares the consumer's usual size with the sizes determined by a garment's manufacturer in order to select the garment most likely to fit the consumer is disclosed, for example, in United Sates Patent Publication No. 2006/0287877.

According to the technique described above, consumers can find garments that fit their own body dimensions.

Here, there are wide variations in consumers' body dimensions and shape, and tastes in garments vary from consumer to consumer. For this reason, even if the garment is of the same model and the same brand, the amount of material required for the production of a garment differs depending on the size and design of the garment, and in some cases production equipment also differs. For this reason, in general, the cost required for the production of a garment differs even if the garment is of the same model and the same brand.

In a garment made-to-order system where an orderer customizes a garment and places an order for the garment, it is preferable to appropriately reflect material cost of the garment in the price of the garment. Also, if a user can easily check the price of the garment when he/she customizes the garment, usability of the orderer at the time of ordering improves.

This invention focuses on these points, and an object of the present invention is to provide a technique that presents the price of the garment to the orderer at the time of customizing the garment.

SUMMARY

An aspect of the present invention is an information processing method performed by a processor. This method comprises the steps of receiving a selection of a garment from a user, calculating a price of the garment on the basis of a type of the selected garment and parameters relating to a design and materials set for the garment, causing the display part to display the calculated price, and changing the parameters in conjunction with an input from the user. The displaying causes the display part to display the price that reflects the changed parameters in response to the change of the parameters.

Another aspect of the present invention is a garment order reception management apparatus. This apparatus comprises a garment selection part that receives a selection of a garment from a user, a price calculation part that calculates a price of the garment on the basis of a type of the selected garment and parameters relating to a design and materials set for the garment, a display control part that causes a display part to display the calculated price, and a parameter changing part that changes the parameters in conjunction with an input from the user. The display control part causes the display part to display the price that reflects the changed parameters in response to the change of the parameters.

Yet another aspect of the present invention is a non-transitory storage medium storing a program. The non-transitory storage medium storing a program makes a computer perform a garment selecting function of receiving a selection of a garment from a user, a price calculating function of calculating a price of the garment on the basis of a type of the selected garment and parameters relating to a design and materials set for the garment, a display controlling function of causing a display part to display the calculated price, and a parameter changing function of changing the parameters in conjunction with an input from the user. The display controlling function causes the display part to display the price that reflects the changed parameters in response to the change of the parameters.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Outline of the Embodiment>

Figure 1:
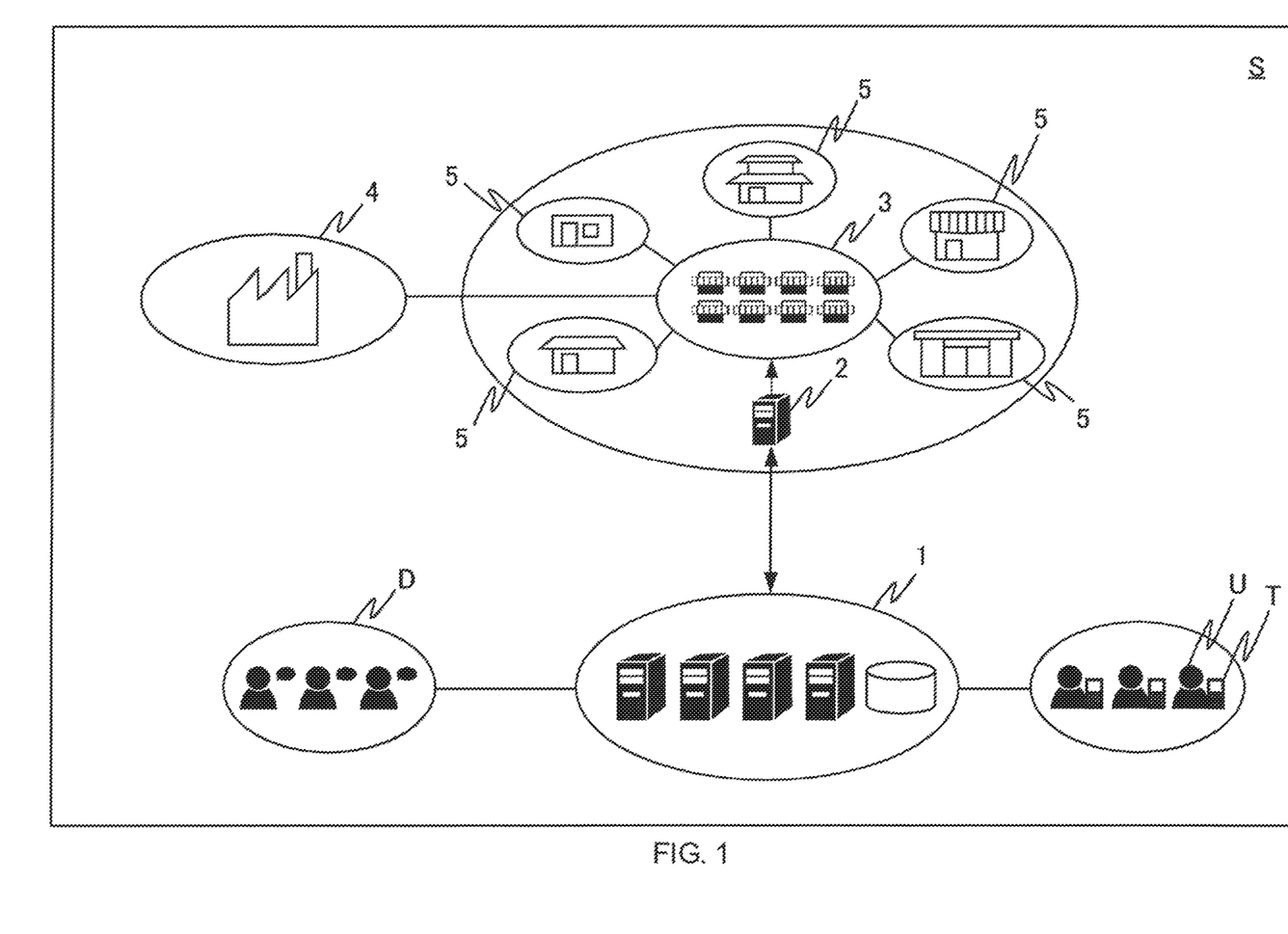
FIG. 1 is a schematic diagram showing an outline of a garment made-to-order system according to the embodiment.

An outline of the embodiment will be explained while referring to FIG. 1. FIG. 1 is a schematic diagram showing an outline of a garment made-to-order system S according to the embodiment. The garment made-to-order system S includes a garment order reception management apparatus 1, a seamless knitting machine control apparatus 2, a seamless knitting machine 3, a plant 4, and a store 5.

The garment order reception management apparatus 1 communicates with each communication terminal T of a plurality of users U via a network such as the Internet, where the users U are orderers. The garment order reception management apparatus 1 is also connected in a communicable manner to an information terminal of a designer D of garments that the garment order reception management apparatus 1 handles. The garment order reception management apparatus 1 is connected also to the seamless knitting machine control apparatus 2 in a communicable manner.

The garment order reception management apparatus 1 provides a customization function for the design and materials of the garment to the communication terminal T of the user U. The garment order reception management apparatus 1 acquires, from the communication terminal T of the user U, types (including size variations) of garments the user U wishes to purchase and specifications of the designs and materials of the garments. Here, a wearer and the user U may be the same, or if the user U places an order for the garment with an intention to let someone other than himself/herself wear it, such as a gift to his/her friend or family member, the wearer and the user U may be different.

The seamless knitting machine control apparatus 2 can communicate with one or more seamless knitting machines 3 and controls an operation of each seamless knitting machine 3. The seamless knitting machine control apparatus 2 acquires production information of the garment which the user U ordered from the garment order reception management apparatus 1. On the basis of the acquired production information of the garment, the seamless knitting machine control apparatus 2 selects a seamless knitting machine 3 to be used for manufacturing that garment. Next, the seamless knitting machine control apparatus 2 transmits the production information to the selected seamless knitting machine 3 and makes the seamless knitting machine 3 manufacture the garment.

The seamless knitting machine 3 is an apparatus that knits the garments on the basis of the production information received from the seamless knitting machine control apparatus 2 and uses, as raw materials, fibers and the like that contain a structural protein and are made in the plant 4. Because the seamless knitting machine 3 can knit a garment three-dimensionally in one entire piece, the process of cutting out each part from fabrics and sewing them together (cut-and-sewn process) is basically unnecessary. Because no material is discarded due to cutting, the garments that are manufactured by the seamless knitting machine 3 create little waste.

Also, in FIG. 1, the store 5 is a store that provides the garment manufactured by the seamless knitting machine 3 to the user U. A specific example of the store 5 is a laundromat, a convenience store, or various kinds of shopping centers. Another example of the store 5 is a distribution center of a shipping carrier or the like. In the former case, the user U receives the garment over the counter at the store 5. In the latter case, the user U can have the ordered garment delivered to a designated place such as the user U's home.

Generally, the same types of garments of the same brand are often sold for a fixed price regardless of their sizes. The material cost of small size garments should be lower compared to that of the large size garments because fewer raw materials are used for the small size garments compared to the large size garments, but such a difference is seldom reflected in the price. In contrast, in the garment made-to-order system S according to the embodiment, the garment order reception management apparatus 1 changes the production information depending on size information of the wearer of the garment. For this reason, the garment order reception management apparatus 1 can calculate a total amount of material required for the production of a garment. This eventually increases the sense of fairness which the users U may feel regarding the price determination, because the garment order reception management apparatus 1 according to the embodiment determines a price that reflects the material cost of the garment.

Also, the garment order reception management apparatus 1 according to the embodiment displays the purchasing price of the garment in conjunction with customization on the screen where the user U customizes the garment. Because the user U can customize the garment while checking the purchasing price, a situation where the garment becomes expensive due to the customization against the user U's intention can be suppressed.

Hereinafter, the garment order reception management apparatus 1 included in the garment made-to-order system S will be described in more detail.

<Functional Configuration of the Garment Order Reception Management Apparatus 1>

Figure 2:
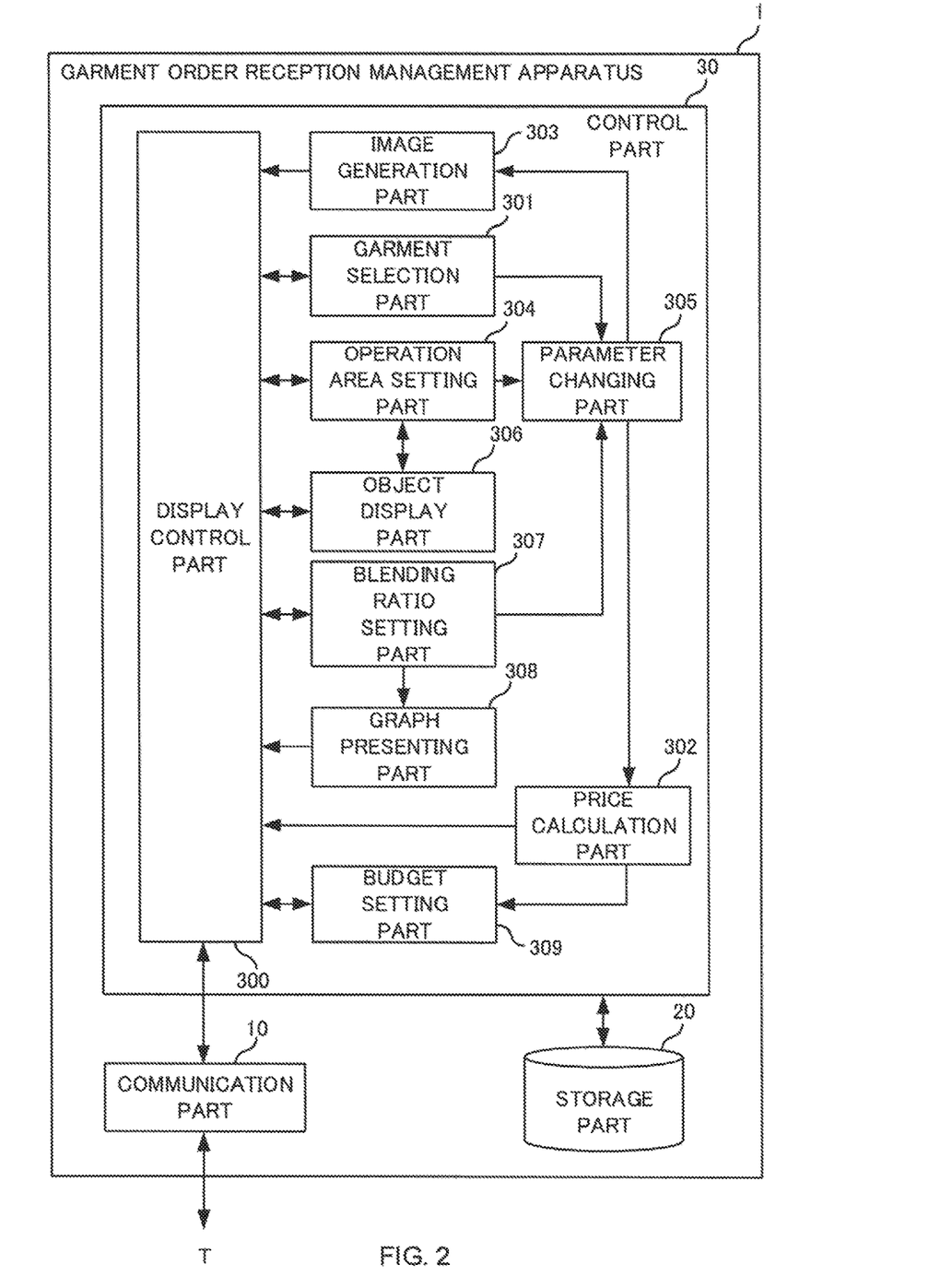
FIG. 2 is a schematic diagram showing a functional configuration of a garment order reception management apparatus according to the embodiment.

FIG. 2 is a schematic diagram showing an outline of a functional configuration of the garment order reception management apparatus 1 according to the embodiment. The garment order reception management apparatus 1 according to the embodiment is realized by calculation resources of cloud computing such as a cloud server. The garment order reception management apparatus 1 includes a communication part 10, a storage part 20, and a control part 30. From the perspective of the communication terminal T of the user U, the garment order reception management apparatus 1 functions as a webserver or its equivalent server that responds to a request of the communication terminal T.

FIG. 2 shows a functional configuration for achieving a process performed between the garment order reception management apparatus 1 and the communication terminal T according to the first embodiment, and other configurations are omitted. In FIG. 2, each element mentioned as a functional block performing various procedures may include, in terms of hardware, a central processing unit (CPU), a main memory, and other large scale integration (LSI). Further, in terms of software, various procedures are realized with programs loaded in the main memory or the like. Accordingly, it is understood by those skilled in the art that each functional block may be realized in various forms by hardware only, software only, or a combination thereof, and is not limited to any of them.

The communication part 10 is a communication interface that allows the garment order reception management apparatus 1 to communicate with the communication terminal T of the user U. The communication part 10 is realized by known communication modules, for example, a Wi-Fi (registered trademark) module, a local area network (LAN) module, and the like.

The storage part 20 is a mass-storage device such as a hard disc drive (HDD) or a solid state drive (SSD) that stores (i) a read only memory (ROM) which stores a basic input output system (BIOS) for a computer, and the like that realize the garment order reception management apparatus 1, (ii) a random access memory (RAM) which is a work area of the garment order reception management apparatus 1, (iii) an operating system (OS) and application programs, and (iv) various types of information to be referenced when executing the application programs.

The control part 30 includes a processor such as a central processing unit (CPU) or a graphic processing unit (GPU) of the garment order reception management apparatus 1, and functions as a garment selection part 301, a price calculation part 302, an image generation part 303, an operation area setting part 304, a parameter changing part 305, an object display part 306, a blending ratio setting part 307, a graph presenting part 308, and a budget setting part 309 by executing programs stored in the storage part 20.

Hereinafter, the functional configuration of the garment order reception management apparatus 1 according to the embodiment and a graphical user interface (GUI) to be displayed on a display part of the communication terminal T will be described while referring to FIGS. 2 to 8, as appropriate.

The display control part 300 controls the GUI to be displayed on the communication terminal T of the user U. More specifically, the display control part 300 provides the communication terminal T with the GUI for realizing a function of each unit of the control part 30 via the communication part 10. Hereinafter, each part of the garment order reception management apparatus 1 according to the embodiment displays the GUI on the display part of the communication terminal T via the display control part 300 and the communication part 10, and the descriptions in this regard may be omitted.

The garment selection part 301 receives a selection of a garment from the user. More specifically, the garment selection part 301 provides the communication terminal T of the user U with the GUI for selecting a garment in response to a request from the communication terminal T acquired through the communication part 10.

Figure 3:
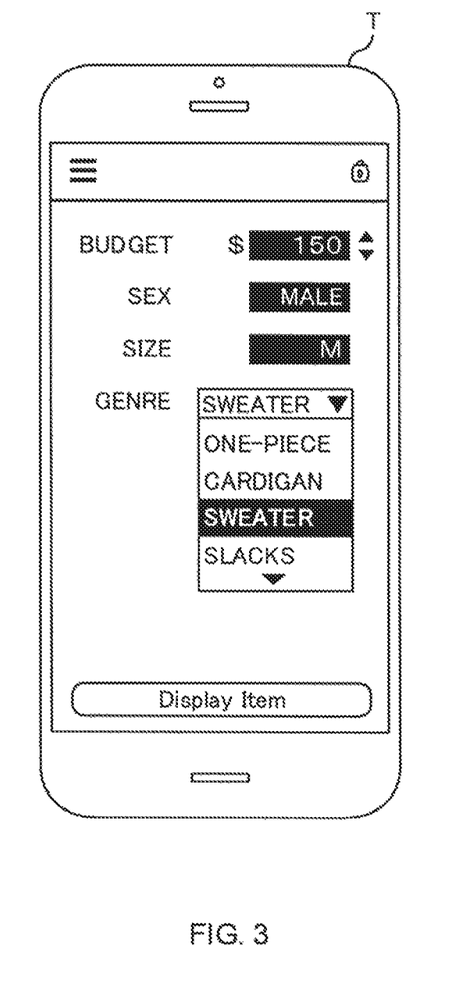
FIG. 3 is a diagram showing an example of a garment selection screen displayed on a communication terminal according to the embodiment.

FIG. 3 is a diagram showing an example of a garment selection screen displayed on the communication terminal T according to the embodiment. An example of the GUI shown in FIG. 3 is an example of a front page of the garment selection screen displayed on the communication terminal T according to the embodiment. On the front page of the garment selection screen, the user U can select the budget for purchasing a garment, the sex of a wearer of the garment, the size of the garment, and the genre of garment.

In the example illustrated in FIG. 3, the user U selects "$150" as the maximum budget, "Male" as the sex of the wearer, "M" as the size of the garment, and "sweater" as the genre of garment. It should be noted that if the user U leaves a field for the budget blank in the GUI shown in the FIG. 3, the maximum budget is not set. The garment selection part 301 receives, through the communication part 10, information input to the GUI displayed on the communication terminal T.

When the user U selects an "item display icon" for displaying a specific item of the selected genre of garment, a more detailed item selection screen (not shown) is displayed on the display part of the communication terminal T. For example, when the user U selects a "sweater" as the genre of garment, various garments classified as sweaters are displayed on the communication terminal T. This allows the user U to easily select the garment he/she likes.

The garment order reception management apparatus 1 according to the embodiment is a part of the garment made-to-order system S and may receive a request for customization of the user U regarding the garment selected by the user U. For example, when the user U selects an "M-size sweater" as the type of garment, the user U may adjust the sleeve length, the shape of a neckline, materials of the sweater, and the like. Therefore, changeable parameters relating to the design, the material, and the manufacturing process of the garment are set for each of the garments handled by the garment order reception management apparatus 1 according to the embodiment.

Here, the "parameter relating to the design" is a parameter representing the outline of the garment selected by the user U. Roughly speaking, the parameter relating to the design includes a parameter representing the size of the garment and a parameter representing the shape of the garment. The parameter representing the shape of the garment includes (i) a parameter representing the type of each part of the garment (for example, types of the shape of a neckline would be a round-neck, a henry-neck, or the like), (ii) a parameter representing the length and the width of each part of the garment, and (iii) a parameter representing the size and the like of mesh when the garment is a knit. Further, a "parameter relating to materials" is a parameter for specifying the materials of the garment. If the garment is composed of a plurality of materials instead of a single material, the blending ratio is also included in the parameter relating to materials. The "parameter relating to the manufacturing process" includes at least one of an index indicating the time required to manufacture the garment and an index indicating the complexity of the manufacturing process. It should be noted that a default parameter database (not shown) associating each of the garments with its default parameter is stored in the storage part 20 in advance.

Figure 4:
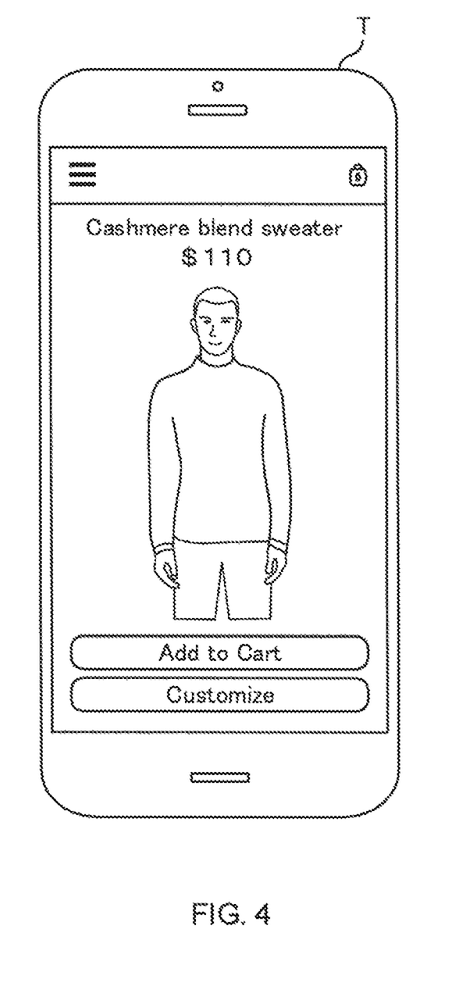
FIG. 4 is a diagram showing an example of a selection result display screen displayed on the communication terminal according to the embodiment.

FIG. 4 is a diagram showing an example of a selection result display screen displayed on the communication terminal T according to the embodiment. FIG. 4 shows the GUI displayed when the user U selects a "cashmere blend sweater" on the item selection screen. The default parameters are set for the garment because the user U has not customized the garment at this stage. Specifically, in the cashmere blend sweater shown in FIG. 4, the parameters are set such that the length of a sleeve is "long sleeve," the neck line is "round neck," and the material contains 45% protein-based silk and 55% cashmere.

The price calculation part 302 calculates the price of the garment on the basis of the parameters of the garment selected by the user U. More specifically, the price calculation part 302 calculates the total amount of materials required for manufacturing the garment on the basis of the parameters of the garment and determines a price that reflects the material cost of the garment. The display control part 300 causes the display part of the communication terminal T to display the price calculated by the price calculation part 302. FIG. 4 shows an example where $110 is displayed as the price of the garment.

Figure 5:
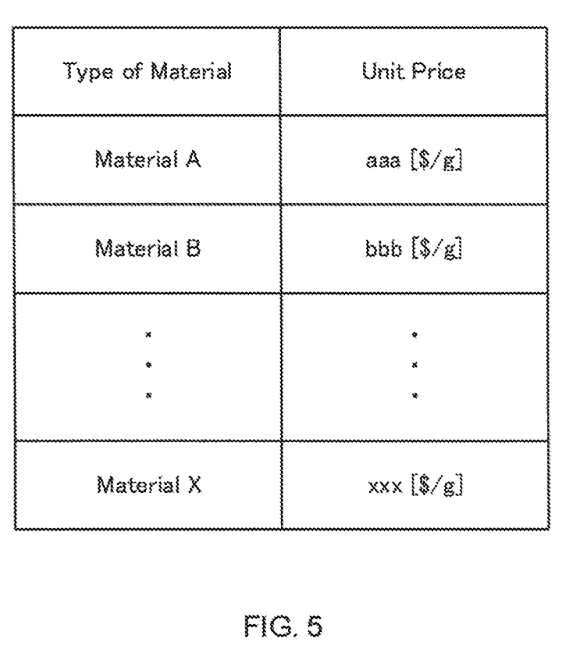
FIG. 5 is a schematic diagram showing a data configuration of a material unit price database indicating materials of a garment and their unit prices in a table.

FIG. 5 is a schematic diagram showing a data configuration of a material unit price database indicating materials of a garment and their unit prices in a table. The material unit price database is stored in the storage part 20 and is managed by the price calculation part 302. The price calculation part 302 calculates the price of the garment on the basis of the unit price of the material and the amount of the material used for the garment.

Specifically, the price calculation part 302 obtains the total amount of each of the materials required for manufacturing the garment from the parameters set for the garment. The price calculation part 302 acquires the unit price of each of the materials from the material unit price database, and calculates the material cost by multiplying the acquired unit price by the total amount of each of the materials. Accordingly, the greater the amount of material used for the garment, the more the price calculation part 302 increases the value of the price, that is, the material cost of the garment can be reflected in the price of the garment.

The price calculation part 302 calculates the final price by adding expenses for manufacturing the garment to the calculated material cost of the garment. At this stage, the price calculation part 302 calculates the price of the garment further on the basis of the parameter relating to the manufacturing process set for the garments. A detailed explanation is omitted, but the expenses for manufacturing the garment vary depending on the parameter relating to the manufacturing process of the garment. Depending on the customization by the user U, a special device may be required for manufacturing, and in such a case, the price calculation part 302 adds the cost resulting from the use of the special device to the price of the garment.

The image generation part 303 generates an appearance image of the garment shown in FIG. 4 on the basis of the parameters set for the garment. When the user U selects the "customize" icon for customizing the garment in the GUI shown in FIG. 4, the display screen of the communication terminal T transitions to a customization screen.

Figure 6A:
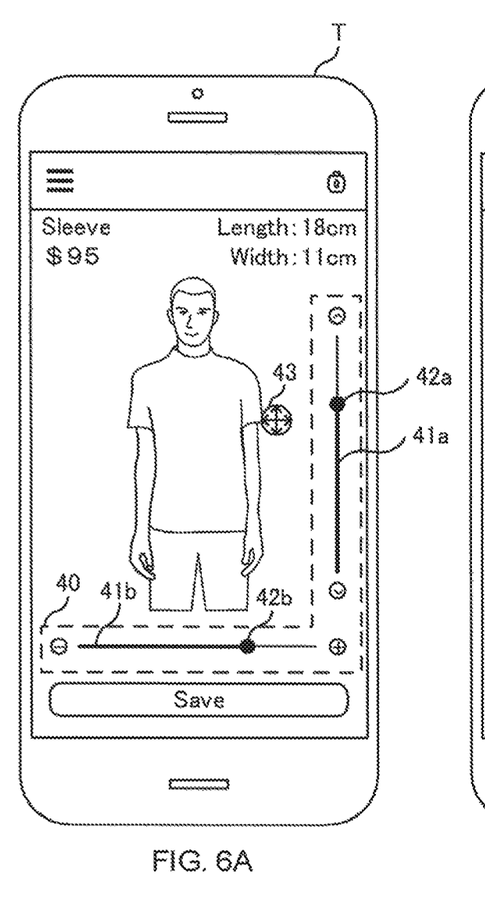
FIG. 6A is a diagram showing an example of a customization screen displayed on the communication terminal according to the embodiment.
Figure 6B:
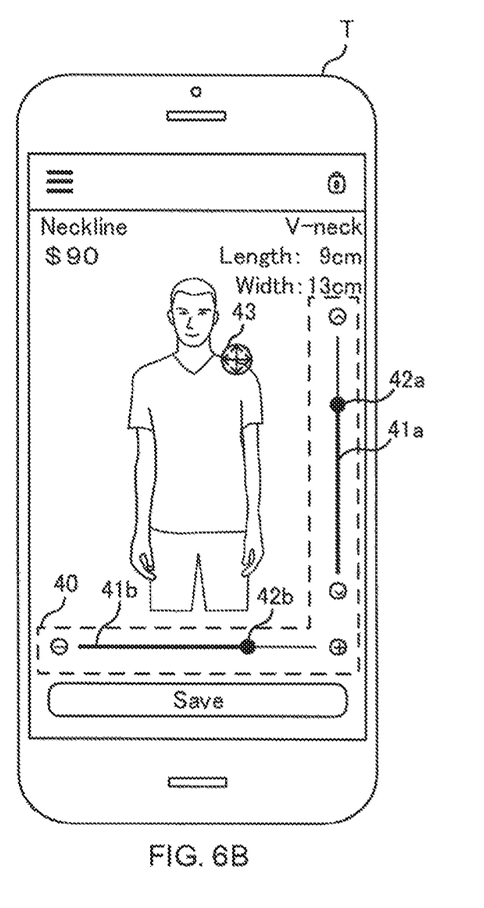
FIG. 6B is a diagram showing an example of a customization screen displayed on the communication terminal according to the embodiment.

FIGS. 6A and 6B are each a diagram showing an example of the customization screen displayed on the communication terminal T according to the embodiment. Specifically, FIG. 6A is a diagram showing the customization screen for sleeves, and FIG. 6B is a diagram showing the customization screen for the shape of a neckline.

In FIGS. 6A and 6B, an area shown by the broken lines is an operation area 40 for receiving, from the user U, an input of a change operation for changing the parameters. The operation area 40 is set on the display part of the communication terminal T by the operation area setting part 304. The parameter changing part 305 changes the parameters set for the garment in conjunction with an operation input performed in the operation area 40 by the user U. Hereinafter, the change of parameters is explained in more detail.

As explained above, the changeable parameters relating to the design, the materials, and the manufacturing process of the garments are set for each of the garments handled by the garment order reception management apparatus 1 according to the embodiment. The parameter changing part 305 is capable of continuously changing at least some of the parameters relating to the design or the parameters relating to the materials among the parameters set for the garment. In order to realize the above, the object display part 306 displays a first object 41 that extends through the operation area 40 and a second object 42 that moves on the first object 41 in accordance with the operation of the user U on the display part of the communication terminal T.

In each example shown in FIGS. 6A and 6B, the object display part 306 displays two first objects 41: a vertical first object 41a, and a horizontal first object 41b. Further, the object display part 306 displays a vertical second object 42a on the vertical first object 41a and a horizontal second object 42b on the horizontal first object 41b. By operating the vertical second object 42a, the user U can continuously change the position of the vertical second object 42a on the vertical first object 41a.

Since the vertical first object 41a extends in the vertical direction of the display part of the communication terminal T, the user U can move the vertical second object 42a vertically on the display part. The user U can operate the horizontal second object 42b to continuously change its position on the horizontal first object 41b. Since the horizontal first object 41b extends in the horizontal direction of the display part of the communication terminal T, the user U can move the horizontal second object 42b horizontally on the display part. The parameter changing part 305 changes at least one of the parameters relating to the design and the parameters relating to the materials among the parameters set for the garment on the basis of the displacement of the change operation in the operation area 40.

In each example shown in FIGS. 6A and 6B, a changing part indication icon 43 is an icon indicating a part whose parameter is adjusted. In FIG. 6A, the changing part indication icon 43 is placed at the position of a sleeve to show that the GUI is for the user U to customize the sleeve.

Specifically, in FIG. 6A, the vertical second object 42a on the vertical first object 41a corresponds to the length of the sleeve. Further, the horizontal second object 42b on the horizontal first object 41b corresponds to the width of the sleeve. When the user U moves the vertical second object 42a upward on the display part of the communication terminal T, the parameter changing part 305 changes a parameter relating to the length of the sleeve set for the garment to make the sleeve shorter. Similarly, when the user U moves the horizontal second object 42b to the right direction on the display part of the communication terminal T, the parameter changing part 305 changes a parameter relating to the width of the sleeve set for the garment to make the sleeve wider.

In FIG. 6B, the changing part indication icon 43 is placed at the position of the neckline to show that the GUI is for the user U to customize the shape of the neckline. Each time the user U taps the changing part indication icon 43, the shape of the neckline cyclically changes in order of a round-neck, a turtle-neck, a U-neck, a V-neck, and the like. FIG. 6B shows a case where a V-neck is selected for the shape of the neckline, and the vertical second object 42a is used to adjust the length (depth) of the notch, and the horizontal second object 42b is used to adjust the width of the notch.

Figure 7A:
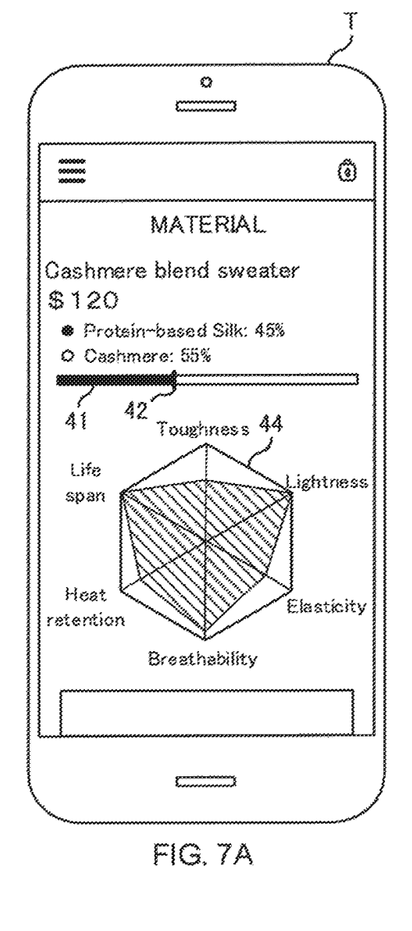
FIG. 7A is a diagram showing another example of the customization screen displayed on the communication terminal according to the embodiment.
Figure 7B:
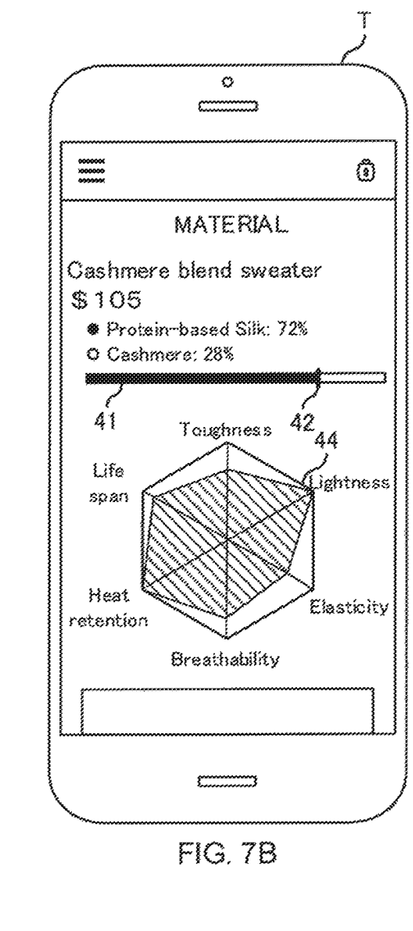
FIG. 7B is a diagram showing another example of the customization screen displayed on the communication terminal according to the embodiment.
Figure 7C:
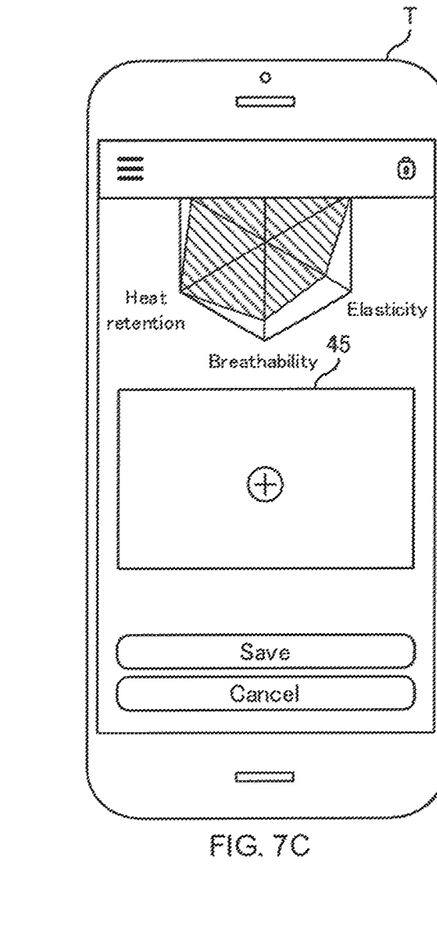
FIG. 7C is a diagram showing another example of the customization screen displayed on the communication terminal according to the embodiment.

FIGS. 7A to 7C each show another example of the customization screen displayed on the communication terminal T. Specifically, they each show an example of a screen for customizing the material of the garment. In the examples shown in FIGS. 7A to 7C, the second object 42 corresponds to the blending ratio of the materials of the garment.

A blending ratio setting part 307 receives, from the user U, a setting of the blending ratio of the materials composing the selected garment. The GUI shown in each of FIGS. 7A to 7C is a GUI for customizing the blending ratio of the materials for the cashmere blend sweater. The materials for the cashmere blend sweater are cashmere and protein-based silk, and when the user U changes the position of the second object 42 on the first object 41, the blending ratio setting part 307 acquires the blending ratio in conjunction with the position. When the user U changes the position of the second object 42 so that the blending ratio of any material is 100%, the garment will be manufactured of a single material.

A graph presenting part 308 displays a graph indicating the property of the garment based on the set blending ratio on the display part of the communication terminal T. In FIGS. 7A to 7B, a radar chart 44 is a graph indicating the property (toughness, lightness, elasticity, breathability, heat retention, and life span) of the cashmere blend sweater of the set blending ratio. When the user U moves the second object 42 to change the blending ratio, the graph presenting part 308 changes the radar chart 44 in conjunction with the change. Accordingly, the user U may determine the blending ratio of the materials while checking the properties of the garment. Further, in FIG. 7C, a textile display area 45 is an area displaying a textile of the garment using the materials blended at the set blending ratio. The user U may check the texture of the garment by observing the textile display area 45.

When the user U customizes the garment, the parameter changing part 305 changes the parameters in conjunction with the input from the user U. For example, when the user U shortens the length of the sleeve, less material is used for manufacturing the garment. Further, when the user U increases the blending ratio of a high unit price material, the material cost for manufacturing the garment increases.

Upon changing the parameter, the display control part 300 displays the price that reflects the changed parameter on the display part of the communication terminal T. For example, upon changing the blending ratio of the materials, the display control part 300 causes the display part to display the price of the garment based on the changed blending ratio. In such a way, since the price calculation part 302 changes the price of the garment in conjunction with the continuous change of the parameter, the user U may set various parameters while checking the final price of the garment.

As shown in FIGS. 6A, 6B, and 7A to 7C, in response to the user U's input of the change of the parameter, the display control part 300 causes the display part to display the appearance image that reflects the changed parameter. For example, when the user U moves the vertical second object 42a downward on the screen in FIG. 6A, the parameter is changed so as to make the sleeve longer in conjunction with the input. Therefore, when the user U moves the vertical second object 42a downward on the screen, the display control part 300 causes the display part to display the appearance image of the garment with the sleeve lengthened in conjunction with the input. In such a way, since the parameter changing part 305 changes the parameters relating to the design on the basis of the amount and the direction of displacement of the second object 42, the user U may customize the garment intuitively while checking the screen.

The user U may set the budget for the garment as explained by referring to FIG. 3. The budget setting part 309 receives the setting of the budget prepared by the user U for purchasing the garment. Here, the price of the garment may exceed the budget because of the customization of the garment by the user U. Accordingly, when the price calculated by the price calculation part 302 exceeds the budget set by the user U, the display control part 300 causes the display part of the communication terminal T to display a message providing notification to that effect.

Figure 8:
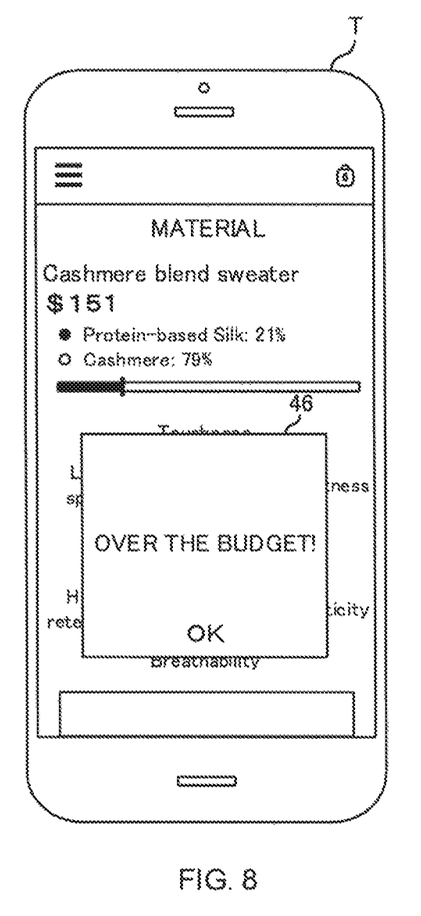
FIG. 8 is a diagram showing an example of an over-budget notice screen displayed on the communication terminal according to the embodiment.

FIG. 8 is a diagram showing an example of an over-budget notice screen displayed on the communication terminal T according to the embodiment. The example shown in FIG. 8 is a display example in a case where the price of the garment exceeds $150 because of the customization when the user U has set the budget at a maximum of $150. As shown in FIG. 8, since the display part of the communication terminal T displays an over-budget notice message 46, the user U may easily notice that the price of the garment has exceeded the budget unintentionally due to the customization.

Figure 9:
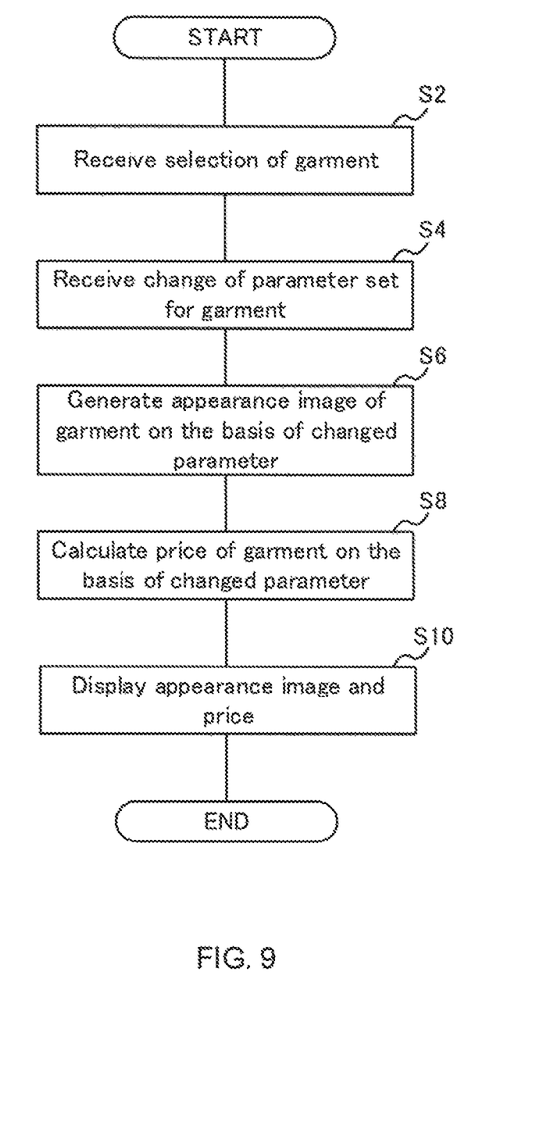
FIG. 9 is a flowchart illustrating an information process executed by the garment order reception management apparatus according to the embodiment.

FIG. 9 is a flowchart showing an information process executed by the garment order reception management apparatus 1 according to the embodiment. The process in the flowchart starts upon, for example, activation of the garment order reception management apparatus 1.

The garment selection part 301 receives a selection of a garment from the user (S2). The parameter changing part 305 receives a change of a parameter set for the garment from the user U (S4). The image generation part 303 generates an appearance image of the garment on the basis of the changed parameter (S6).

The price calculation part 302 calculates a price of the garment on the basis of the changed parameter (S8). The display control part 300 causes the communication terminal T of the user U to display the appearance image generated by the image generation part 303 and the price calculated by the price calculation part 302 (S10). By repeating these processes, the garment order reception management apparatus 1 may provide a customization function of garment to the user U.

As explained above, the garment order reception management apparatus 1 according to the embodiment may provide a technique that presents the price of the garment to the orderer at the time of customizing the garment. In particular, since the garment order reception management apparatus 1 according to the embodiment causes the communication terminal T of the user U to display the price that reflects the changed parameter in response the user U changing the parameter set for the garment, the user U may customize the garment while checking the price.

The present invention has been described above on the basis of the exemplary embodiments. The technical scope of the present invention is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

In the above, cases where the graph presenting part 308 changes the radar chart 44 in conjunction with the change of the blending ratio by moving the second object 42 in the customization screen shown in FIGS. 7A and 7B were explained. Alternatively or in addition thereto, the user U may change the radar chart 44 so that the blending ratio is changed to have the property indicated by the changed radar chart 44.

This may be achieved by, for example, a chart changing reception part (not shown) provided in the garment order reception management apparatus 1 receiving a change of the radar chart from the user U, and then, the parameter changing part 305 determining the blending ratio indicating the property that is as same as or similar to the property indicated by the radar chart by referring to a correspondence table (not shown) stored in the storage part 20. The correspondence table stores a plurality of types of blending ratio in association with a property of material at each blending ratio previously determined by an experiment. Accordingly, the user U may change the blending ratio intuitively by changing the radar chart even without the knowledge of the property of each material.

Cases where the apparatus that manufactures the garment in the garment made-to-order system S is the seamless knitting machine 3 were explained above. However, the apparatus that manufactures the garment in the garment made-to-order system S is not limited to the seamless knitting machine 3. Even in cases where garments are manufactured in an automated factory and the like adopting the process of cutting out each part from fabrics and sewing them together (cut-and-sewn process), the GUI provided to the communication terminal T by the garment order reception apparatus 1 according to the embodiment may be applied.

What is claimed is:

1. An information processing method performed by a processor, the method comprising:
   receiving a selection of a garment from a user;
   calculating a price of the garment on a basis of a type of the selected garment and parameters relating to a design and materials set for the garment;
   causing a display part to display the calculated price;
   changing the parameters in conjunction with an input from the user;
   receiving a setting of a blending ratio of the materials composing the selected garment from the user; and
   causing the display part to display a graph indicating a property of the garment based on the set blending ratio,
   wherein causing the display part to display the calculated price includes causing the display part to display the price that reflects the changed parameters in response to the changing of the parameters and causing the display part to display the price of the garment based on the set blending ratio in response to the setting of the blending ratio of the materials.

2. The information processing method according to claim 1 further comprising:
   generating an appearance image of the garment on the basis of the parameters,
   wherein causing the display part to display the calculated price includes causing the display part to display the appearance image that reflects the changed parameters in response to the input from the user.

3. The information processing method according to claim 1, wherein calculating the price of the garment includes calculating the price of the garment further on the basis of a parameter relating to a manufacturing process set for the garment.

4. The information processing method according to claim 3, wherein the parameter relating to the manufacturing process includes at least one of an index indicating a time required to manufacture the garment and an index indicating a complexity of the manufacturing process.

5. The information processing method according to claim 1, wherein the calculating the price of the garment includes calculating the price of the garment on the basis of a unit price of the material and an amount of the material used for the garment.

6. The information processing method according to claim 5, wherein the calculating the price of the garment includes increasing a value of the price as the amount of the material used for the garment increases.

7. The information processing method according to claim 1, wherein changing the parameters is capable of continuously changing at least some of the parameters relating to the design or the parameters relating to the materials, and wherein calculating the price of the garment includes changing the price of the garment in conjunction with the continuous change of the some of the parameters.

8. The information processing method according to claim 1, further comprising:
   setting an operation area on the display part that receives an input of a change operation from the user for changing the parameters,
   wherein changing the parameters includes changing at least one of the parameters relating to the design and the parameters relating to the materials on the basis of a displacement of the change operation in the operation area.

9. The information processing method according to claim 1, further comprising:
   causing the display part to display a first object that extends through an operation area and a second object that moves on the first object in accordance with an operation of the user,
   wherein changing the parameters includes changing the parameters relating to the design on the basis of an amount and a direction of displacement of the second object.

10. The information processing method according to claim 1, further comprising:
    receiving a setting of a budget of the user for purchasing the garment,
    wherein causing the display part to display the calculated price includes causing the display part to display that the price calculated exceeds the budget when the price exceeds the budget.

11. A garment order reception management apparatus comprising a processor operatively coupled to memory, the processor configured to:
    receive a selection of a garment from a user;
    calculate a price of the garment on a basis of a type of the selected garment and parameters relating to a design and materials set for the garment;
    cause a display part to display the calculated price;
    change the parameters in conjunction with an input from the user;
    receive a setting of a blending ratio of the materials composing the selected garment from the user; and
    cause the display part to display a graph indicating a property of the garment based on the set blending ratio,
    wherein causing the display part to display the price that reflects the changed parameters in response to the change of the parameters and causing the display part to display the price of the garment based on the set blending ratio in response to the setting of the blending ratio of the materials.

12. A non-transitory computer-readable medium comprising software instructions that, when executed by a processor, perform a method comprising:
    receiving a selection of a garment from a user;
    calculating a price of the garment on a basis of a type of the selected garment and parameters relating to a design and materials set for the garment;
    causing a display part to display the calculated price; and
    changing the parameters in conjunction with an input from the user;
    receiving a setting of a blending ratio of the materials composing the selected garment from the user; and
    causing the display part to display a graph indicating a property of the garment based on the set blending ratio,
    wherein causing the display part to display the calculated price causes the display part to display the price that reflects the changed parameters in response to the changing of the parameters and causing the display part to display the price of the garment based on the set blending ratio in response to the setting of the blending ratio of the materials.

* * * * *